May 27, 1958 J. TINDALE 2,836,072
MECHANICAL RESOLVING MECHANISMS
Filed Aug. 29, 1955 7 Sheets-Sheet 1
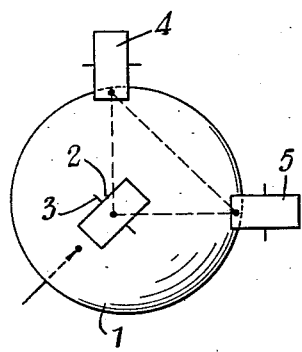
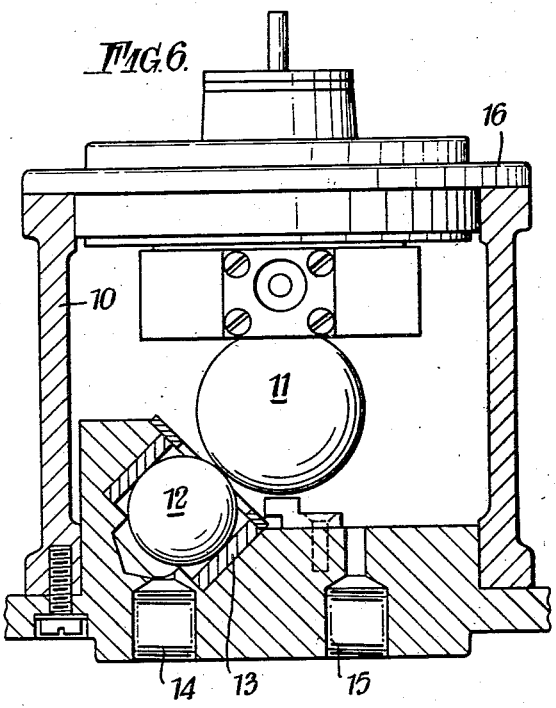
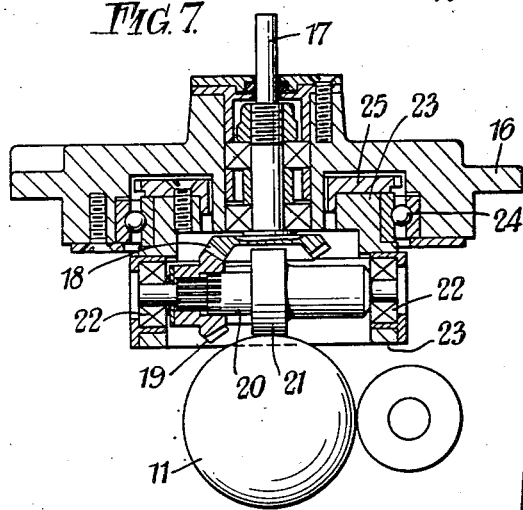
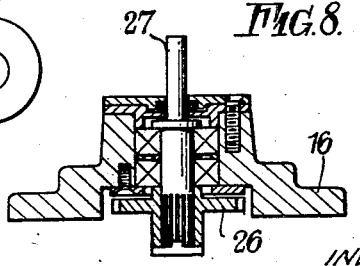
INVENTOR
John Tindale
By Bailey, Stephens and Huettig
Attorneys INVENTOR
John Tindale May 27, 1958  J. TINDALE  2,836,072
MECHANICAL RESOLVING MECHANISMS
Filed Aug. 29, 1955  7 Sheets-Sheet 3

INVENTOR
John Tindale
By Bailey, Stephens and Huettig
ATTORNEYS

May 27, 1958    J. TINDALE    2,836,072
MECHANICAL RESOLVING MECHANISMS
Filed Aug. 29, 1955    7 Sheets-Sheet 4
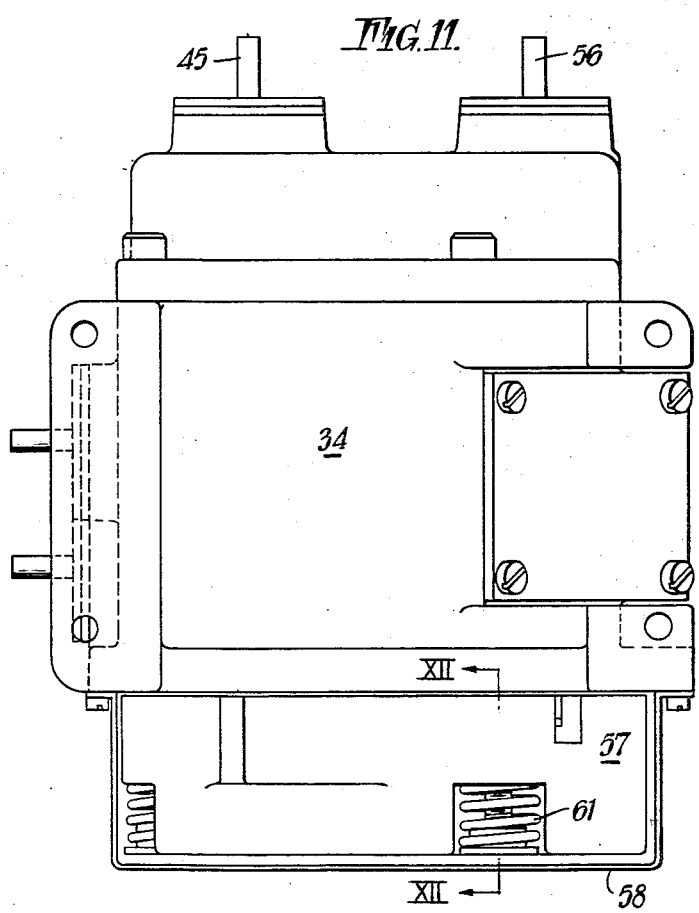
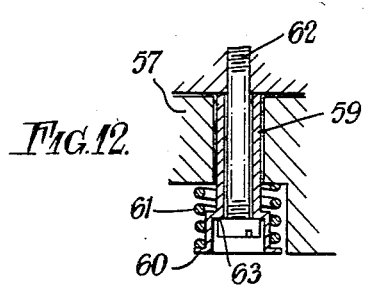
INVENTOR
John Tindale
By Bailey Stephens and Huettig
Attorneys

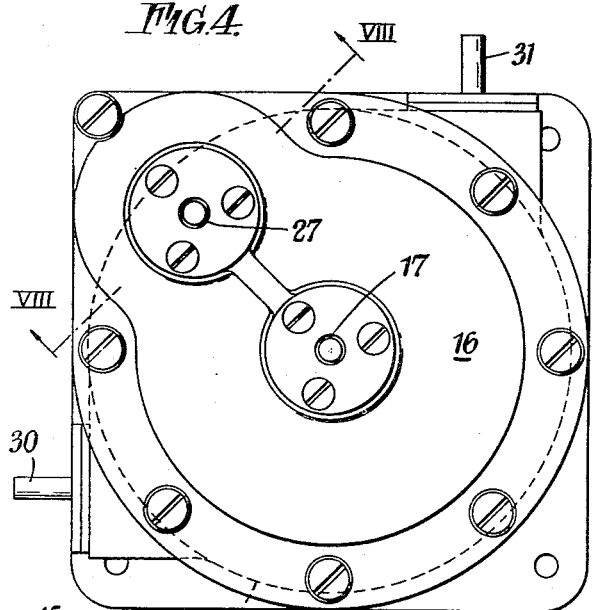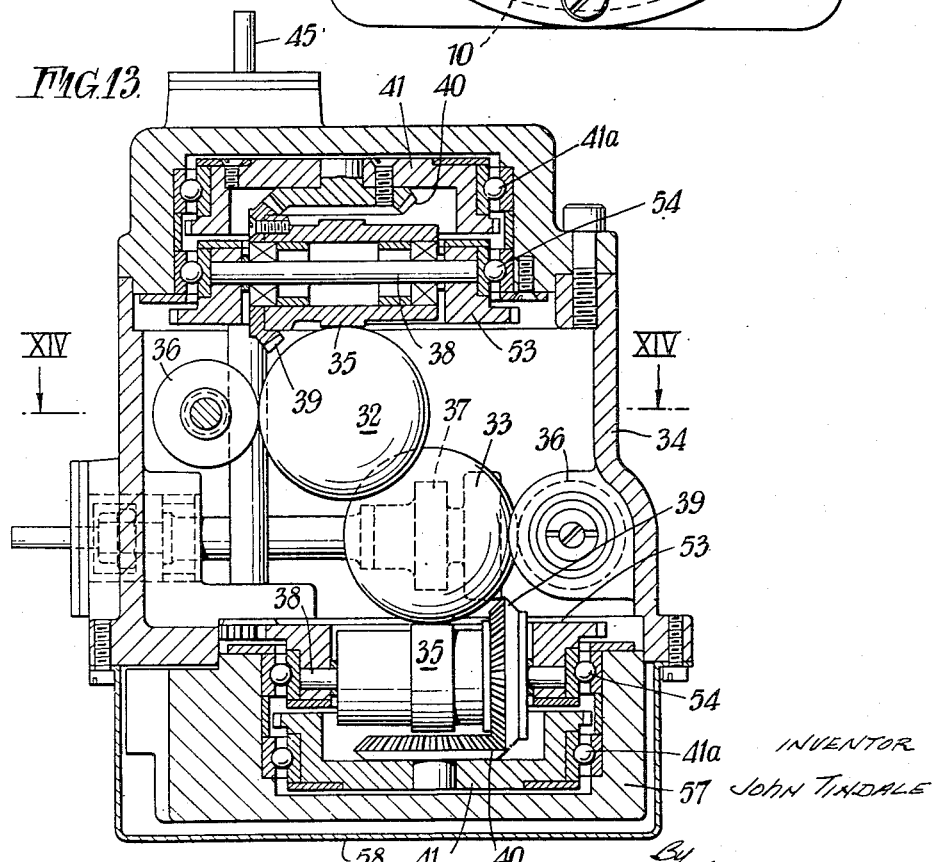

May 27, 1958  J. TINDALE  2,836,072
MECHANICAL RESOLVING MECHANISMS
Filed Aug. 29, 1955  7 Sheets-Sheet 6

INVENTOR
JOHN TINDALE
By Bailey, Stephens and Huettig
Attorneys

May 27, 1958 J. TINDALE 2,836,072
MECHANICAL RESOLVING MECHANISMS
Filed Aug. 29, 1955 7 Sheets-Sheet 7

INVENTOR
John Tindale

United States Patent Office 2,836,072
Patented May 27, 1958

2,836,072

MECHANICAL RESOLVING MECHANISMS

John Tindale, West Kingsdowne, England, assignor to Elliott Brothers (London) Limited, London, England, a company of Great Britain Application August 29, 1955, Serial No. 531,005

Claims priority, application Great Britain September 1, 1954

16 Claims. (Cl. 74—198)

This invention relates to improvements in mechanical resolving mechanisms and is particularly concerned with improvements in such mechanisms of the kind (hereinafter referred to as being of the "kind specified") comprising a spherical ball which is caused to rotate about its centre by an input roller bearing upon the surface of the ball and capable of rotating about an axis which is parallel to a tangent at the point of contact of the input roller with the surface of the ball and which is angularly adjustable in accordance with the value of the function to be resolved and two output rollers each bearing upon the surface of the ball and each capable of being rotated by rotation of the ball about an axis which is parallel to a tangent to the ball at the respective points of contact of the output rollers with the surface of the ball, the points of contact of the three rollers with the surface of the ball being so disposed that lines drawn from the centre of the ball to these points of contact are mutually perpendicular.

The axes of rotation of the two output rollers are contained in a common plane which passes through the centre of the ball and which is normal to the plane containing the point of contact of the input roller, the point of contact of one of the output rollers and which also passes through the centre of the ball.

Each of the output rollers is rotated by the ball at a speed which is a function of the speed of rotation of the input roller, the diameter of the output roller concerned and the orientation of the plane of rotation of the ball, this latter being determined by the orientation of the axis of rotation of the input roller. Thus if the speed of rotation of the input roller is constant, the speed of rotation of the two output rollers will be respectively a sine and cosine function of the angular displacement of the axis of rotation of the input roller from a zero position.

In order to enable motion to be transferred from the input roller to the ball and from the ball to the two output rollers, it is necessary to apply a force closure on the ball urging it towards the three contact points. It is known to apply forces to the ball, along diameters passing through the points of contact of the three rollers and directed towards these points, by means of three further rollers in contact with the surface of the ball at points diametrically opposite to the points of contact of the input and output rollers, these further rollers being each mounted for rotation about an axis parallel to that of the diametrically opposite roller and being urged resiliently against the ball. In this known arrangement the roller diametrically opposite to the input roller must be orientated with its axis of rotation co-planar with that of the latter and this has been achieved by either gearing the input roller to the diametrically opposite roller so that the axes of the two rollers are orientated simultaneously and to the same degree, or by constructing the roller diametrically opposite to the input roller as a caster roller which automatically orientates itself in accordance with the plane of rotation of the ball.

The use of gearing to achieve the desired result is not entirely satisfactory as it requires the gears to be accurately made and increases the expense of the mechanism and the caster roller arrangement is unsatisfactory as work must be done by the ball on the caster roller to carry it into the correct plane of rotation with a consequent loss of resolution of the trigonometric functions. Furthermore, the use of the rollers diametrically opposite the two output rollers is also not entirely satisfactory as the planes of rotation of these rollers can never simultaneously coincide with the plane of rotation of the ball and in fact most frequently neither of them coincide with that of the ball so that they exert a drag effect on the rotation of the latter. Also these two further rollers being resiliently urged against the ball, usually by means of springs, are mounted on "live spindles" which substantially precludes their use as extra functional outputs.

It is an object of the present invention to provide a resolving mechanism of the kind specified which is substantially free from the disadvantages referred to above.

According to the present invention, in a resolving mechanism of the kind specified means is provided for exerting a force on the ball having a line of action passing through the centre of the ball and intersecting the line joining the point of contact of the input roller with the ball to the centre of the line joining the points of contact of the output rollers with the ball, this force exerting means being such as to exert only a minimum frictional drag on the ball whatever the orientation of the plane of rotation of the latter.

Under ideal conditions the line of action of the force should make an angle of 45° with the radius extending from the centre of the ball to the point of contact of the input roller. In practice, however, it is preferred to make this angle less than 45° by an amount depending upon the efficiency of the mechanism taking account of frictional losses which occur in the bearings of the mechanism.

According to one embodiment of the invention the force exerting means may comprise a spherical ball which is preferably of smaller diameter than the main ball and which is urged into contact therewith by suitable means such as fluid pressure. For example, the smaller spherical ball may be mounted within a cylindrical guide with a small clearance between the surface of this second ball and the internal surface of the guide and a fluid under pressure supplied to the guide to exert a thrust on the second ball urging it into contact with the main ball and exerting the desired force on the latter.

In an alternative embodiment of the invention the main ball may be seated in a part spherical cup of slightly greater radius of curvature and a fluid under pressure fed to this cup to form a cushion between the surface of the ball and that of the cup urging the ball in the desired direction. This cup is constructed to be slightly less than a hemisphere with the centre of pressure of fluid in the line of action of the desired force.

In a further alternative embodiment of the invention two balls may be provided resiliently urged into contact with each other, each ball having an input roller and two output rollers in contact therewith, and the point of contact between the two balls being so arranged that the force exerted by each ball on the other passes through the centre of the respective ball towards and intersects the line joining the point of contact of the respective input roller with the associated ball to the centre of the line joining the points of contact of the associated output rollers with the ball.

In order that the invention may be clearly understood some examples thereof will now be described by way of example with reference to Figs. 1 to 16 of the drawings in which:

Figure 1 is a diagrammatic view illustrating the principle of the invention;

Figure 4 is a top plan view of the mechanism illustrated in Figure 2;

Figure 6 is a section taken on the line VI—VI of Figure 5 with parts omitted;

Figure 7 is a sectional view of the means for driving the input roller of the mechanism shown in Fig. 2;

Figure 8 is a section taken on the line VIII—VIII of Fig. 4;

Figure 11 is a side elevation of the mechanism shown in Fig. 9;

Figure 12 is a part section taken on the line XII—XII of Fig. 11;

Figure 13 is a section taken on the line XIII—XIII of Fig. 14;

Figure 2:
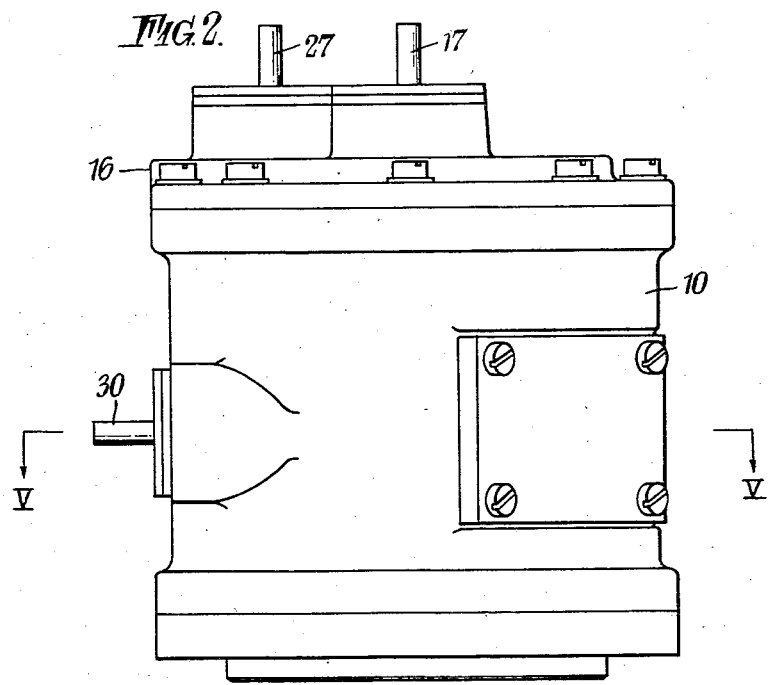
Figure 2 is a side view of a resolving mechanism embodying the invention.
Figure 3:
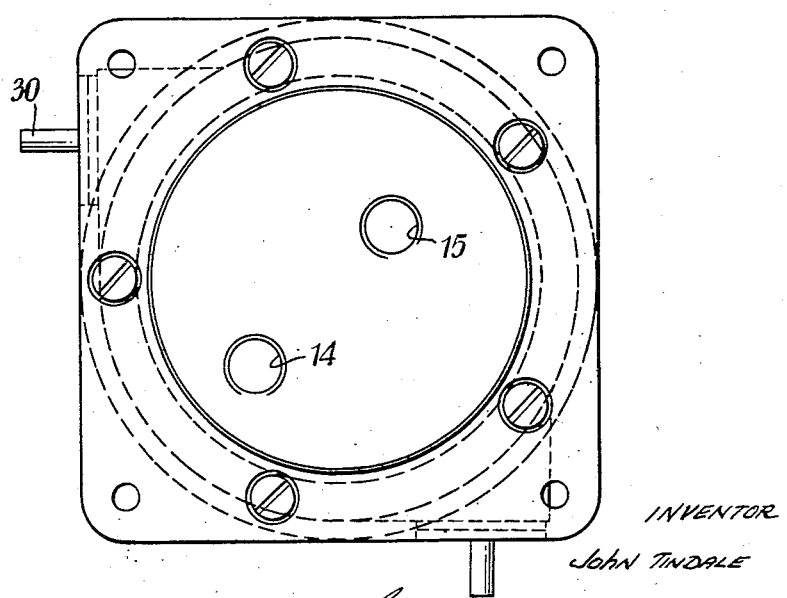
Figure 3 is an end plan view of the mechanism shown in Figure 2.
Figure 9:
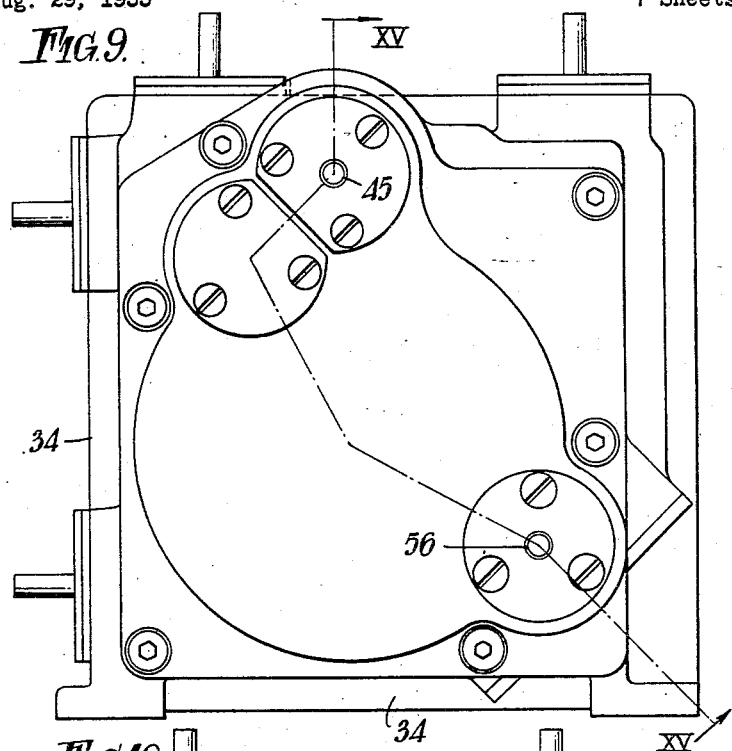
Figure 9 is a top plan view of an alternative mechanism according to the invention.
Figure 10:
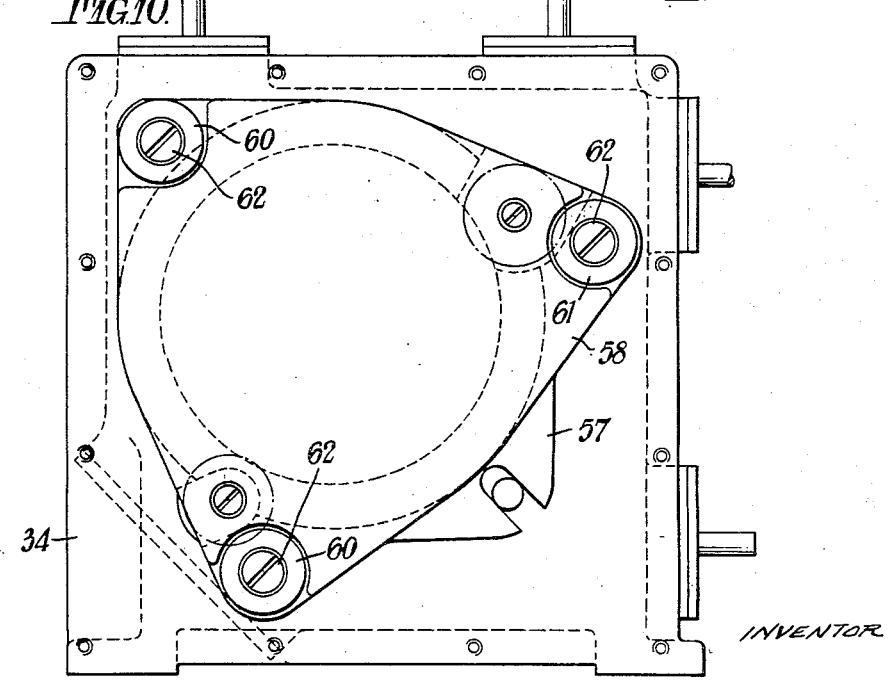
Figure 10 is an under plan view of the mechanism shown in Fig. 9.
Figure 5:
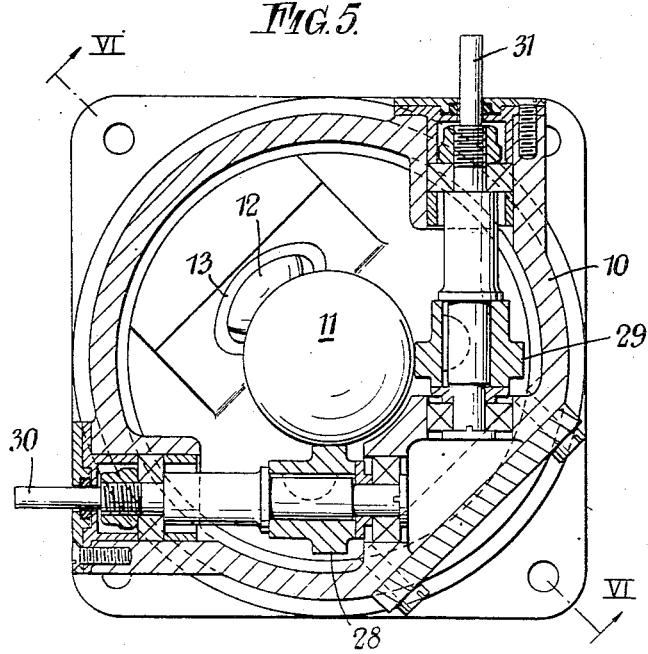
Figure 5 is a section taken on the line V—V of Figure 2.

The principle of the invention is illustrated diagrammatically in Figure 1 which shows a ball 1 adapted to be rotated by an input roller 2 rotatable about the axis of rotation 3 which is parallel to the tangent to the surface of the ball at the point of contact of the input roller 2 therewith and which is capable of being angularly adjusted. Two output rollers 4 and 5 respectively are arranged in contact with the ball 1 and are arranged to be rotated by rotation of the latter each about an axis which is parallel to the tangent to the ball at the points of contacts of the respective output rollers therewith, the points of contact of the input roller 2 and the output rollers 4 and 5 respectively with the surface of the ball being so disposed that radii drawn from the centre of the ball to the respective points of contact are mutually perpendicular. If the input roller 2 is angularly adjustable from a zero position in which its axis of rotation is contained in a plane common to the plane containing the axis of rotation of the output roller 4 through 90° to a position in which its axis of rotation is contained in a plane common to the axis of rotation of the output roller 5 and if the input roller 2 is driven at a constant speed it will be appreciated that the speed of rotation of the output roller 4 is a cosine function of the displacement of the axis of rotation of the input roller 2 from the zero position and that the speed of rotation of the output roller 5 is a sine function of this angular displacement. It will be appreciated that if a single force is applied to the ball in a direction having a line of action passing through the centre of the ball and passing through the median from the apex of a triangle having the three points of contact of the input and output rollers as its apices, the median being drawn from that apex constituted by the point of contact of the input roller 2, this force will have two equal components urging the ball towards the output rollers 4 and 5 respectively and will have a third component urging the ball against the input roller. Under ideal conditions this force should pass through the centre of the ball and have a line of action passing through the median of that triangle drawn from the point of contact of the input roller 2, and it should make an angle of 45° with the radius drawn from the centre of the ball to this point of contact. Under practical conditions owing to frictional losses it is preferred that this line of action should be arranged to depart from the angle of 45° referred to by an amount depending upon the efficiency of the mechanism.

Figure 16:
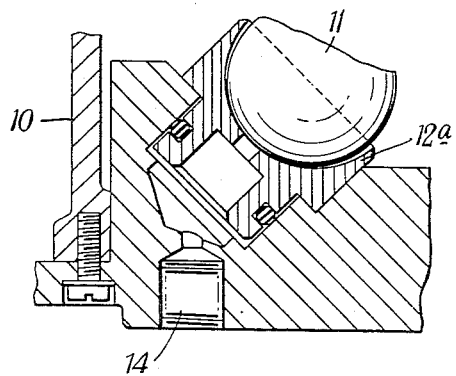
Figure 16 is a detail view showing a modification of the mechanism illustrated in Fig. 6.

In the example illustrated in Figures 2–8 inclusive a mechanical resolver in accordance with the present invention comprises a substantially cylindrical housing 10 containing a spherical ball 11 which may, for example, be of 1 inch diameter, this ball bearing on a further smaller ball 12, for example, of .625 inch in diameter, which is freely rotatable in a cylindrical guide 13. The guide 13 is fed with a fluid under pressure through an inlet 14 in the housing 2 such that the ball 12 is urged against the ball 11 to exert a force on the latter. An outlet 15 is provided in the housing 2 through which the fluid escaping from the guide 13 may be drawn off. One end of the housing 10 is closed by a cover 16 through which extends in a fluid tight manner a driving shaft 17 carrying at its inner end a bevel gear 18 which engages with the bevel gear 19 carried by a shaft 20 carrying the input roller 21 which bears against the surface of the ball 11 and which is mounted for rotation about its axis in bearings 22. The bearings 22 are carried in the wall of a substantially cylindrical sleeve 23 which is rotatable in a ball-race 24 about the axis of the spindle 17 and which carries a gear 25 which meshes with a gear 26 carried by an input spindle 27 which extends in a fluid tight manner through the closure 16 with its axis parallel to that of the axis of the spindle 17. Thus rotation of the spindle 17 rotates the input roller 21 about its axis of rotation and the input spindle 27 rotates the shaft 20 about the axis of the driving shaft 17 to control the angular orientation of the axis of rotation of the input roller 21. Also bearing against the surface of the ball are two output rollers 28 and 29 respectively carried on a spindle 30 and 31 respectively, these spindles extending through the housing 10 in a fluid tight manner. The points of contact of the rollers 21, 28 and 29 are such that the radii drawn through the center of the ball to these points of contact will be mutually perpendicular. The axis of the cylindrical sleeve 13 is so disposed that the line of action of the force exerted by the ball 12 on the ball 11 will pass through the centre of the ball 11 and will make an angle with the radius drawn from the centre of the ball 11 to the point of contact of the input roller 21 with the surface thereof which is slightly less than 45°, the departure of this angle from 45° being determined by the efficiency of the mechanism. The line of action of this force is arranged to pass through the median of the triangle having the points of contact of the input roller 21 and the output rollers 28 and 29 at its apices, this median extending from the point of contact of the input roller 21. In the operation of the mechanism described the input roller 21 is rotated about the axis of the shaft 20 by means of the driving shaft 17 through the gears 18 and 19 and the angular orientation of the axis of the shaft 20 from a zero position is determined by the angular input to the input spindle 27. The ball 11 is rotated by the rotation of the input roller 21 and causes the output rollers 28 and 29 to rotate about their respective axes at a speed which is respectively a function of the sine and cosine of the angular displacement of the axis of rotation of the input roller 21 from the zero position referred to and the speed of rotation of the input roller 21 which latter is usually but not necessarily a constant speed. It will be appreciated that by reason of the force urging the ball 11 into driving contact with the input roller 21 and output rollers 28 and 29 being applied thereto through the freely rotatable ball 12 the drag effect of the ball 12 on the main ball 11 is at a minimum irrespective of the plane of rotation of the ball 11. A similar result may be achieved in the manner illustrated in Figure 16 by replacing the ball 12 and the guide 13 with a part-spherical cup member 12a which is slightly less than a hemisphere and which is of slightly greater radius than the ball 11 to receive part of the latter. A fluid is then forced under pressure between the cup member 12a and the surface of the ball 11 by way of the inlet 14 to urge the ball 11 in desired direction, the centre of pressure of this fluid being located accordingly.

Figure 14:
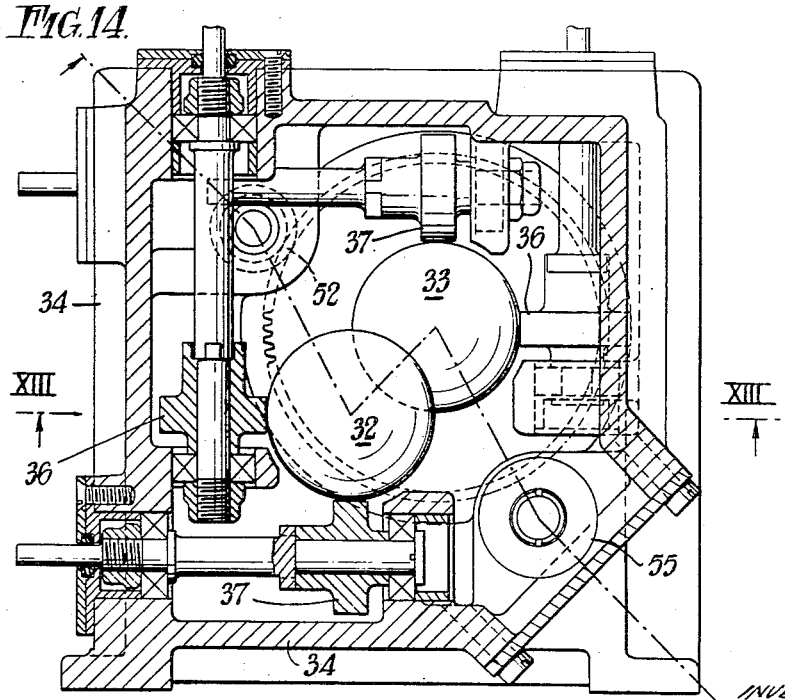
Figure 14 is a section taken on the line XIV—XIV of Fig. 13.
Figure 15:
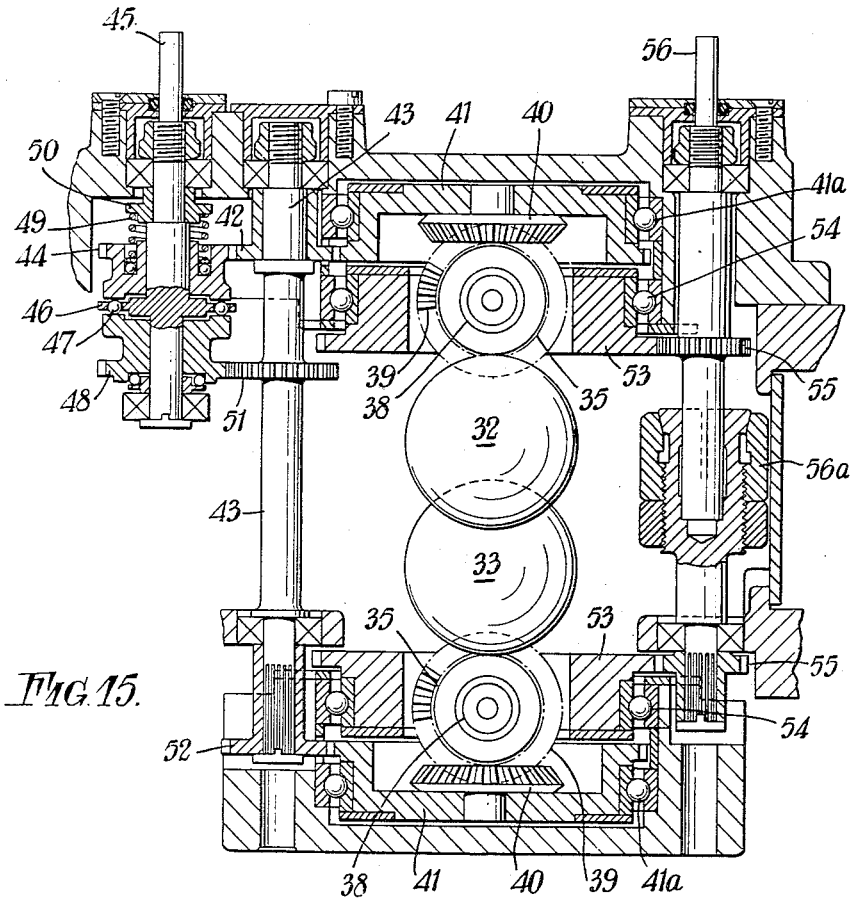
Figure 15 is a section taken on the line XV—XV of Fig. 14.

In the second example illustrated in Figs. 9 to 15 of the accompanying drawings the mechanism comprises two balls 32 and 33 of the same size contained in a substantially cylindrical housing 34 and bearing one upon the other. Each ball has associated with it an input roller 35 (Fig. 15) and two output rollers 36 and 37 respectively (Figs. 13 and 14). Each input roller 35 is mounted on a shaft 38 carrying a bevel gear 39 which meshes with a bevel gear 40 carried by a gear wheel 41 rotatable in bearings 41a. The gear wheel 41 associated with the ball 32 engages a gear wheel 42 which is carried by and is freely rotatable on a connecting shaft 43. The gear wheel 42 is mounted without substantial axial play on the shaft 43 and meshes with a further gear wheel 44 which is freely movable on a driving shaft 45 which is disposed parallel with the shaft 43 and which carries a cage element 46 carrying ball bearings 47. A further gear wheel 48 is carried by the driving input shaft 45 and rotatable with respect thereto, and spring means 49 is interposed between the gear wheel 44 and a fixed abutment 50 on the input shaft 45 whereby surfaces on the two gear wheels 44 and 48 are urged against the ball bearings 47 with such pressure that angular rotation of the driving shaft 45 rotates both gearwheels 44 and 48. This arrangement acts in effect as a differential coupling. The gear wheel 48 meshes with a further gear wheel 51 fixedly carried on the connecting shaft 43 to drive the latter which also carries a further gear wheel 52 mounted thereon in a non-rotatable manner, this gear wheel 52 being in mesh with the gear wheel 41 associated with the ball 33. Thus rotation of the driving shaft 45 at a substantially constant speed drives both the input rollers 35 and the differential coupling arrangement referred to above ensures that both balls 32 and 33 rotate at the same speed despite any slight differences in the diameters of the associated parts.

The shafts 38 associated with the input rollers 35 are each carried in a cylindrical sleeve 53 which is mounted in bearings 54 for rotation about the axis of the bevel gears 40 and carries teeth, each set of which meshes with a corresponding gear wheel 55 carried on an input shaft 56 which is formed in two parts secured together by a collet coupling 56a which permits of relative angular adjustment of the two parts to obtain initial alignment of the orientation of the two rollers 35. Angular rotation of the input shaft 56 thus rotates the respective sleeves 53 and adjusts simultaneously the orientation of the axis of rotation of each input roller 35 to the same degree. The output rollers 36 and 37 are disposed relative to the associated ball 32 or 33 and the associated input roller 35 as described in the previous example and the balls 32 and 33 are arranged to contact each other in such manner that when they are urged firmly together the forces of action and reaction at this point of contact will have a line of action passing through the centres of the respective balls and will be in such a direction as to pass through the median of the respective triangles formed by the points of contact of the input and output rollers with the associated ball, this median being drawn from the point of contact of the associated input roller 35, and will make an angle of slightly less than 45° with the radius drawn from the centre of the associated ball to this last-mentioned point of contact, this departure from 45° being of a magnitude calculated from the efficiency of the mechanism. The force urging the balls 32 and 33 into contact is provided by means of an end closure 57 remote from input ends of the shafts 45 and 56 and carrying one of the input roller assemblies and an end cover 58 bolted to the housing 10. Three symmetrically disposed sleeves 59 (Fig. 12) extend through the end closure 57 and are formed at their outer ends with a flange 60 between which and the closure 57 are arranged compression springs 61 which urge the end closure 57 towards the housing 10 and the associated input roller 35 against the ball 33. A bolt 62 extends through each sleeve 59 with its head engaging a shoulder 63 in each sleeve 59, the bolt engaging (in a manner not shown) with a threaded bore in the housing 10 whereby the compression of the associated spring 61 may be readily adjusted to a suitable value.

In the operation of this mechanism both input rollers 35 are driven at substantially the same speed by the driving shaft 45 and the associated gearing and the input to the mechanism is provided by angular rotation of the input shaft 56 which controls simultaneously and to the same degree the orientation of the axis of rotation of each input roller 35. An output is obtained from each set of output rollers 36 and 37 and these two outputs may be utilised as desired.

It will be appreciated that although the gearing used to control simultaneously and to the same degree the orientation of the respective axes of rotation of the two input rollers 35 may be somewhat similar to that used in a known construction for controlling simultaneously the orientation of the axis of rotation of an input roller associated with a single ball and the diametrically opposite roller urging the ball towards the input roller, which gearing has been mentioned as being not entirely satisfactory, it is not strictly analogous thereto as in the present instance the gearing controls two input rollers each associated with a separate ball and each driven for rotation about their respective axes of rotation from a common driving shaft 45 and the mechanism provides simultaneously two sets of outputs. The provision of two sets of outputs off-sets any expense introduced by the use of the gearing.

What I claim is:

1. A resolving mechanism comprising a spherical ball rotatable about its centre, an input roller bearing upon the surface of the ball and capable of rotating about an axis which is parallel to a tangent at the point of contact of said input roller and said surface of said ball and which is angularly adjustable in accordance with the value of the function to be resolved, rotation of said input roller producing a corresponding rotation of said ball about its centre, two output rollers each bearing upon said surface of said ball and each by rotation of said ball capable of being rotated about an axis which is parallel to a tangent to the ball at the respective points of contact of said output rollers with said surface of said ball, the point of contact of said input roller and the points of contact of said output rollers with said surface of said ball being so disposed that lines drawn from the centre of said ball to said points of contact are mutually perpendicular, and force exerting means for exerting a force on said ball having a line of action passing through the centre of said ball and intersecting a line joining said point of contact of said input roller to the centre of a line joining said points of contact of said output rollers, said force exerting means exerting only a minimum frictional drag on said ball whatever the orientation of the plane of rotation of the latter.

2. A mechanism according to claim 1 wherein said line of action of said force exerting means makes an angle of the order of 45° with that radius of said ball extending from the centre thereof to said point of contact of said input roller.

3. A mechanism according to claim 1 wherein said force exerting means comprises a second spherical ball urged into contact with said rotatable ball.

4. A mechanism according to claim 3 wherein said second ball is of smaller diameter than said rotatable ball.

5. A mechanism according to claim 3 wherein fluid pressure means is provided to urge said second ball into contact with said rotatable ball.

6. A mechanism according to claim 3 comprising a cylindrical guide dimensioned to receive said second ball with a small clearance and a source of fluid under pressure connected to the interior of said guide to exert a thrust on said second ball urging it into contact with said rotatable ball.

7. A mechanism according to claim 1 wherein said force exerting means comprises a partly spherical cup in which said ball is seated and which is slightly less than a hemisphere and has a radius slightly greater than that of said ball and a source of fluid under pressure connected to the interior of said cup to form a cushion of pressure fluid between said ball and said cup, the centre of pressure of said fluid cushion acting along said line of action.

8. A resolving mechanism comprising a spherical ball rotatable about its centre, an input roller bearing upon the surface of the ball and capable of rotating about an axis which is parallel to a tangent at the point of contact of said input roller and said surface of said ball and which is angularly adjustable in accordance with the value of the function to be resolved, rotation of said input roller producing a corresponding rotation of said ball about its centre, two output rollers each bearing upon said surface of said ball and each by rotation of said ball capable of being rotated about an axis which is parallel to a tangent to the ball at the respective points of contact of said output rollers with said surface of said ball, the point of contact of said input roller and the points of contact of said output rollers with said surface of said ball being so disposed that lines drawn from the centre of said ball to said points of contact are mutually perpendicular, a cup member having a surface which is part of a sphere less than a hemisphere and has a radius slightly greater than that of said ball, the surface of said ball being adjacent to said surface of said cup member, and a source of fluid under pressure connected to the interior of said cup member to provide a cushion of pressure fluid between said surface of said cup member and said surface of said ball, said fluid cushion having a centre of pressure with a line of action passing through the centre of said ball and intersecting a line joining said point of contact of said input roller to the centre of a line joining said points of contact of said output rollers.

9. A resolving mechanism comprising a main spherical ball rotatable about its centre, an input roller bearing upon the surface of said main ball and capable of rotating about an axis which is parallel to a tangent at the point of contact of said input roller and said surface of said main ball and which is angularly adjustable in accordance with the value of the function to be resolved, rotation of said input roller producing a corresponding rotation of said main ball about its centre, two output rollers each bearing upon said surface of said main ball and each by rotation of said ball capable of being rotated about an axis which is parallel to a tangent to the ball at the respective points of contact of said output rollers with said surface of said main ball, the point of contact of said input roller and the points of contact of said output rollers with said surface of said main ball being so disposed that lines drawn from the centre of said ball to said points of contact are mutually perpendicular, a second spherical ball rotatably mounted and disposed in contact with said main ball at a point on the surface of the latter which lies on a radius which when extended intersects a line joining said point of contact of said input roller to the centre of a line joining said points of contact of said output rollers and means urging said second ball against said main ball to exert a force on the latter having a line of action along said extended radius.

10. A mechanism according to claim 9 comprising a cylindrical guide within which said second ball is partly disposed and a source of fluid under pressure connected to the interior of said guide to urge said second ball against said main ball.

11. A resolving mechanism comprising two spherical balls each rotatable about its centre, an input roller associated with each ball and bearing upon the surface of the associated ball and capable of rotating about an axis which is parallel to a tangent at the point of contact of said input roller and the surface of the associated ball and which is angularly adjustable in accordance with the value of the function to be resolved, rotation of each input roller producing a corresponding rotation of the associated ball about its centre, two output rollers associated with each ball and each bearing upon said surface of the associated ball and each by rotation of the associated ball capable of being rotated about an axis which is parallel to a tangent to the associated ball at the respective points of contact of said output rollers with said surface of the associated ball, the point of contact of each input roller and the points of contact of the output rollers associated with the same ball being so disposed that lines drawn from the centre of the ball to said points of contact are mutually perpendicular, said balls being disposed in contact with each other at a point on their surfaces which for each ball lies on a radius which when extended beyond the centre of the ball intersects a line joining the point of contact of the associated input roller to the centre of a line joining the points of contact of the associated output rollers and force exerting means for urging one ball against the other.

12. A mechanism according to claim 11 comprising a housing in which said balls are disposed and an end closure carrying the input roller associated with one of said balls and resiliently urged towards said housing to urge said one ball against the other.

13. A mechanism according to claim 11 including a differential coupling connecting said two input rollers together whereby both balls may be rotated at the same speed by a single driving means.

14. A mechanism according to claim 11 comprising a gear wheel associated with each input roller to control the angular adjustment thereof and connecting means connecting said gear wheels together, said connecting means comprising a two-part shaft and a collet coupling connecting said two parts of the shaft together whereby relative angular adjustment of said two parts may be obtained for initial alignment of the angular adjustment of said input rollers.

15. A resolving mechanism comprising a housing, two spherical balls of substantially the same diameter as each other disposed in said housing in contact with each other and each rotatable about its centre, an input roller and two output rollers associated with each ball and bearing upon the associated ball, the points of contact of each input roller and two output rollers with the associated ball lying on radii of the associated ball which are mutually perpendicular and the point of contact between the two balls lying on radii of the respective balls which when extended through the centres of the latter intersect a line joining the point of contact of the associated input roller to the centre of a line joining the points of contact of the output rollers, a differential coupling connecting said two input rollers, an end closure for said housing carrying one of said input rollers and means resiliently urging said end closure towards said housing to urge said two balls into contact.

16. A resolving mechanism comprising a spherical ball rotatable about its centre, three rollers bearing upon the surface of said ball at points of contact therewith which respectively lie on radii of said ball which are mutually perpendicular, at least one of said rollers being capable of rotating said ball and at least one of the other of said rollers being capable of being rotated by rotation of said ball, and force exerting means bearing in a substantially frictionless manner on the surface of said ball at a point lying on a radius of said ball which when extended beyond the centre of said ball intersects a line joining the point of contact of said one roller capable of rotating said ball to the centre of a line joining the points of contact of the other two rollers.

References Cited in the file of this patent
UNITED STATES PATENTS

| | | |
|---|---|---|
| 1,256,234 | Innes | Feb. 12, 1918 |
| 1,701,582 | Mengden | Feb. 12, 1929 |
| 2,477,527 | Pierce | July 26, 1949 |
| 2,528,284 | Newell | Oct. 31, 1950 |